United States Patent [19]

Cheng

[11] Patent Number: 4,481,828
[45] Date of Patent: Nov. 13, 1984

[54] DIFFERENTIAL FLOW RATE SENSOR

[75] Inventor: Paul J. Cheng, Bartlesville, Okla.

[73] Assignee: Phillips Petroleum Company, Bartlesville, Okla.

[21] Appl. No.: 461,315

[22] Filed: Jan. 27, 1983

[51] Int. Cl.³ .............................................. G01N 7/00
[52] U.S. Cl. ............................... 73/861.63; 73/861.66
[58] Field of Search ........... 73/861.63, 861.61, 861.64, 73/861.65, 861.66, 32 A

[56] References Cited

U.S. PATENT DOCUMENTS

| | | | |
|---|---|---|---|
| 1,145,222 | 7/1915 | Wilkinson. | |
| 1,145,234 | 7/1915 | Dodge. | |
| 1,934,759 | 11/1933 | Adelson | 73/861.63 X |
| 3,803,921 | 4/1974 | Dieterich | 73/861.66 X |
| 4,282,751 | 8/1981 | Brown | 73/861.63 X |
| 4,324,143 | 4/1982 | Olson | 73/861.64 X |
| 4,425,807 | 1/1984 | Victor | 73/861.66 X |

*Primary Examiner*—Marshall M. Curtis
*Assistant Examiner*—Vincent P. Kovalick
*Attorney, Agent, or Firm*—A. W. Umphlett

[57] ABSTRACT

A venturi tube fluid flow meter comprising an inlet section with a first pressure probe upstream of the throat section that is an inner-end closed tube traversing the diameter of the inlet section and pressure probe that is a capped tube extending into the flow path of the throat section at the minimum diameter thereof with this tube containing two perforations 180° apart and orthogonal to the center line of the throat section.

2 Claims, 2 Drawing Figures

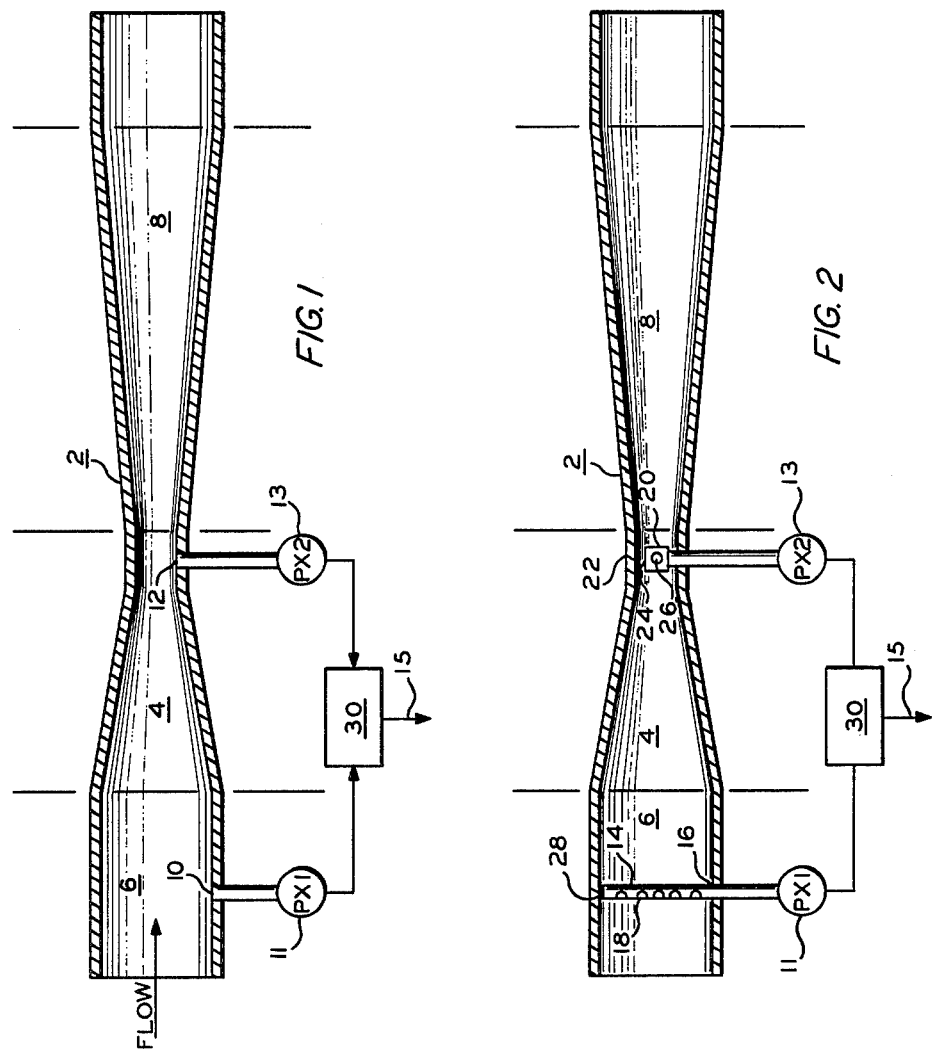

DIFFERENTIAL FLOW RATE SENSOR

BACKGROUND OF THE INVENTION

This invention relates to the measurement of differential pressure. In one of its aspects this invention relates to the use of venturi meters for fluid flow measurement. In still another of its aspects, this invention relates to the configuration of sensing elements in a venturi tube fluid flow meter.

Perhaps the most advantageous aspect of using a venturi meter for flow measurement is the high efficiency of pressure recovery which can also be stated as the low net pressure loss of the system. Conversely, perhaps the greatest disadvantage of using a venturi meter for flow measurement is the low pressure differential signal which can also be stated as a low sensitivity for moderate to low flow rate measurement. In the present invention a design for a flow rate sensor has been set out which preserves the low net pressure loss advantage of the system while maximizing the pressure differential signal thereby minimizing this disadvantageous aspect of a venturi meter.

It is therefore an object of this invention to provide a low pressure loss, high response signal, flow rate sensor. It is another object of this invention to provide a flow measurement system having a high efficiency of pressure recovery combined with a maximized sensitivity for moderate to low flow rate measurement.

Other aspects, objects and the various advantages of this invention will become apparent from reading this specification, study of the drawing and reading the appended claims.

Statement of the Invention

According to this invention, a differential pressure flow meter is provided which has as its components: (a) a venturi tube hereinafter referred to as the tube; (b) a first inner-end capped tubular pressure probe that extends through one wall of the inlet section, hereinafter referred to as the inlet, and transverses the diameter of the inlet upstream of the throat section, hereinafter referred to as the throat, with this first probe containing a plurality of up-stream facing perforations; (c) a second tubular pressure probe extending through the wall of the throat into the flow path of the throat at the minimum diameter of the throat with the second probe closed at its inner end and containing two perforations 180° apart and orthogonal to the center line of the throat; and (d) means connecting said probes external to the tube to sense the differential pressure between the probes.

The apparatus of this invention can best be understood in conjunction with the drawings in which FIG. 1 is a sideview of a basic venturi tube flow meter apparatus of the prior art and FIG. 2 is a side view of the flow meter of the present invention.

Referring now to FIG. 1 the basic venturi flow meter apparatus 2 has as its component parts a throat 4, an inlet 6 upstream of the throat 4 and a recovery cone section, hereinafter referred to as the cone 8 downstream of the throat. Penetrating the upstream inlet 6 is a first pressure port duct 10 and penetrating the throat 4 at its minimum diameter proportion is a second pressure port duct 12. The pressure port ducts 10 and 12 are connected to pressure transmitter 11 and 13 and thence to means 30 for sensing the difference of pressure therebetween and which can be any of well-known pressure differential measurement devices such as a simple manometer or a sophisticated differential pressure recorder or there can be a means for simply reading the pressure at each of the pressure ports.

Referring now to FIG. 2, in which like members will have like numbers, the venturi flow meter 2 is made up of a throat 4 with an inlet 6 upstream of the throat 4 and a cone 8 downstream of the throat 4.

Penetrating the inlet 6 is a first pressure probe 14 which extends as a linear tube across the diameter of the inlet 6 and is affixed for mechanical purposes to the wall of the tube at 16. This first probe 14 is closed at the interior end 28 and contains a plurality of perforations 18 that face upstream.

A second pressure probe 20 passes through the wall of the throat at the minimum diameter thereof and extends into the tube to approximately the centerline thereof. Second probe 20 is closed at the interior end 24 and has two perforations 26 180° apart which are orthogonal to the center line of the tube. Preferably the second probe 20 extends into the tube 2 such that the common centerline of perforations 26 lies in a plane of the center line of the tube 2 that is normal to probe 14.

The probes 14 and 20 are connected to pressure transmitters 11 and 13, respectively. Pressure transmitters 11 and 13 are in turn connected to means 30 for providing differential pressure signal 15.

The configuration and placement of probes 14 and 20 in the apparatus of this invention permits a maximizing of the pressure differential signal while preserving the low net pressure loss aspect of a basic venturi meter. Of particular interest is the placement of the perforations 26 on the second probe 20. It is well-known that fluid pressure around a cylinder submerged in a fluid flow medium varies with the point of measurement thereabout and flow condition. In supercritical fluid flow, the pressure is relatively high at the point directly upstream (0°) on the cylinder and drops to a relatively low value at 90° and 270° and is of an increasing value as the point directly downstream (180°) on the cylinder is approached. At the point directly downstream on the cylinder, the pressure is nearer in value to the pressure directly upstream on the cylinder than it is to the pressure at the points orthogonal to the flow. For subcritical flow, however, the pressure response at the points orthogonal to the direction of flow and at the point directly downstream on the cylinder are about the same. In other words, the positioning of the perforations 26 orthogonal to the flow in the second probe 20 provides increased sensitivity for all flows including both subcritical flow and supercritical flow.

The following example illustrates the magnification of the differential pressure reading when comparing the use of the conventional venturi meter and the venturi meter set forth herein. For the purposes of this example, the venturi sections of the conventional meter and the meter of this invention are duplicates with the upstream conical section of the throat having an angle of convergence of 15° and the downstream cone portion having an angle of divergence of 5°. The upstream diameter of the tube is 3" and the throat diameter is 2".

Flow properties through the venturi sections were calculated with a stream of water and subsequently with a stream of air. Pressure was determined in the conventional venturi at points 10 and 12 which are called P1 and P2, respectively, for this example and at points 14 and 20 for the venturi of the invention which are called P1 and P2 for the purposes of this example. The flow rates and results are tabulated below.

TABLE I

|  | Water | Air |
|---|---|---|
| Upstream Velocity (Ft/Sec) | 1.00 | 20.00 |
| Throat Velocity (Ft./Sec) | 2.25 | 45.00 |
| (P1-P2) Conventional (in. H$_2$O) | 0.76 | 0.36 |
| (P1-P2) Invention (In. H$_2$O) | 3.59 | 1.72 |
| Magnification, Pressure with Invention | 4.72 | 4.78 |

The data above point out the maximization of the pressure differential signal and the apparatus of the present invention as compared to a conventional venturi metering system.

I claim:

1. A venturi tube flow meter comprising:
   (a) an inlet section, a throat section and a recovery cone section;
   (b) a first cylindrical pressure probe extending through one wall of said inlet section and transversing a diameter of said inlet section up-stream of said throat section, said first pressure probe closed at its inner end and containing a plurality of upstream facing perforations;
   (c) a second pressure probe extending through the wall of said throat section into the flow path of said throat section at the minimum diameter of said throat section, said second pressure probe closed at the end within said throat section and containing two perforations 180° apart and orthogonal to the center line of said throat section; and
   (d) means connected to said pressure probes external to said venturi tube to sense difference of pressure therebetween.

2. The apparatus of claim 1 wherein said second pressure probe extends into said throat section such that said two perforations lie in a plane of the center line of said venturi tube that is perpendicular to said first pressure probe.

* * * * *